US 8,570,350 B2

(12) United States Patent
Ikeda et al.

(10) Patent No.: US 8,570,350 B2
(45) Date of Patent: Oct. 29, 2013

(54) SEMICONDUCTOR INTEGRATED CIRCUIT FOR DRIVING DISPLAY PANEL, DISPLAY PANEL DRIVING MODULE, AND DISPLAY DEVICE

(75) Inventors: Hideki Ikeda, Hyogo (JP); Yasuyuki Doi, Kyoto (JP)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 13/093,524

(22) Filed: Apr. 25, 2011

(65) Prior Publication Data

US 2011/0199400 A1 Aug. 18, 2011

Related U.S. Application Data

(63) Continuation of application No. PCT/JP2010/003804, filed on Jun. 8, 2010.

(30) Foreign Application Priority Data

Oct. 22, 2009 (JP) ................................. 2009-243149

(51) Int. Cl.
*G09G 5/10* (2006.01)
*G09G 3/36* (2006.01)
*G09G 5/00* (2006.01)

(52) U.S. Cl.
USPC ......................................................... 345/690

(58) Field of Classification Search
USPC ................... 345/204–215, 690–699, 87–104
See application file for complete search history.

(56) References Cited

U.S. PATENT DOCUMENTS

| | | | | |
|---|---|---|---|---|
| 5,995,073 A * | 11/1999 | Isami et al. | ...................... | 345/89 |
| 6,067,063 A * | 5/2000 | Kim et al. | ........................ | 345/89 |
| 6,518,946 B2 * | 2/2003 | Ode et al. | ........................ | 345/98 |
| 6,778,161 B2 * | 8/2004 | Chen et al. | ...................... | 345/89 |
| 6,924,782 B1 * | 8/2005 | Fujioka et al. | ................... | 345/92 |
| 7,006,114 B2 * | 2/2006 | Sakaguchi | .................... | 345/690 |
| 7,034,797 B2 * | 4/2006 | Maki | ............................. | 345/100 |
| 7,034,810 B2 * | 4/2006 | Goto et al. | ..................... | 345/204 |
| 7,330,066 B2 * | 2/2008 | Huang | ........................... | 327/540 |
| 2003/0137526 A1 * | 7/2003 | Sakaguchi | .................... | 345/690 |
| 2004/0212632 A1 * | 10/2004 | Inada et al. | ................... | 345/690 |

(Continued)

FOREIGN PATENT DOCUMENTS

JP   2004-061805   2/2004

OTHER PUBLICATIONS

Machine translation of Japanese No. 2004-061805.*

*Primary Examiner* — Amr Awad
*Assistant Examiner* — Roberto Flores
(74) *Attorney, Agent, or Firm* — McDermott Will & Emery LLP

(57) ABSTRACT

A display device in which gradation wiring lines of positive polarity included in a (m)th group of wiring lines of positive polarity and gradation wiring lines of positive polarity included in a (m+1)th group of wiring lines of positive polarity are alternately provided, and in which gradation wiring lines of negative polarity included in a (m')th group of wiring lines of negative polarity and gradation wiring lines of negative polarity included in a (m'+1)th group of wiring lines of negative polarity are alternately provided. The device further includes (n)th resistance dividing circuits of positive polarity which include (m)th resistance dividing circuits connected to the (m)th group of wiring lines of positive polarity, and (m+1) th resistance dividing circuits connected to the (m+1)th group of wiring lines of positive polarity. Resistance dividing circuits of negative polarity are connected in a similar manner to the gradation wiring lines of negative polarity.

8 Claims, 11 Drawing Sheets

(56) References Cited

U.S. PATENT DOCUMENTS

| | | | |
|---|---|---|---|
| 2005/0017992 A1* | 1/2005 | Kudo et al. | 345/690 |
| 2006/0238473 A1* | 10/2006 | Hashimoto | 345/89 |
| 2007/0171163 A1* | 7/2007 | Miyata | 345/87 |
| 2007/0257942 A1* | 11/2007 | Kudo et al. | 345/690 |
| 2008/0024419 A1* | 1/2008 | Goto et al. | 345/98 |
| 2008/0174462 A1* | 7/2008 | Tsuchi | 341/144 |
| 2008/0231573 A1* | 9/2008 | Goto et al. | 345/87 |
| 2009/0153593 A1* | 6/2009 | Lee et al. | 345/690 |

* cited by examiner

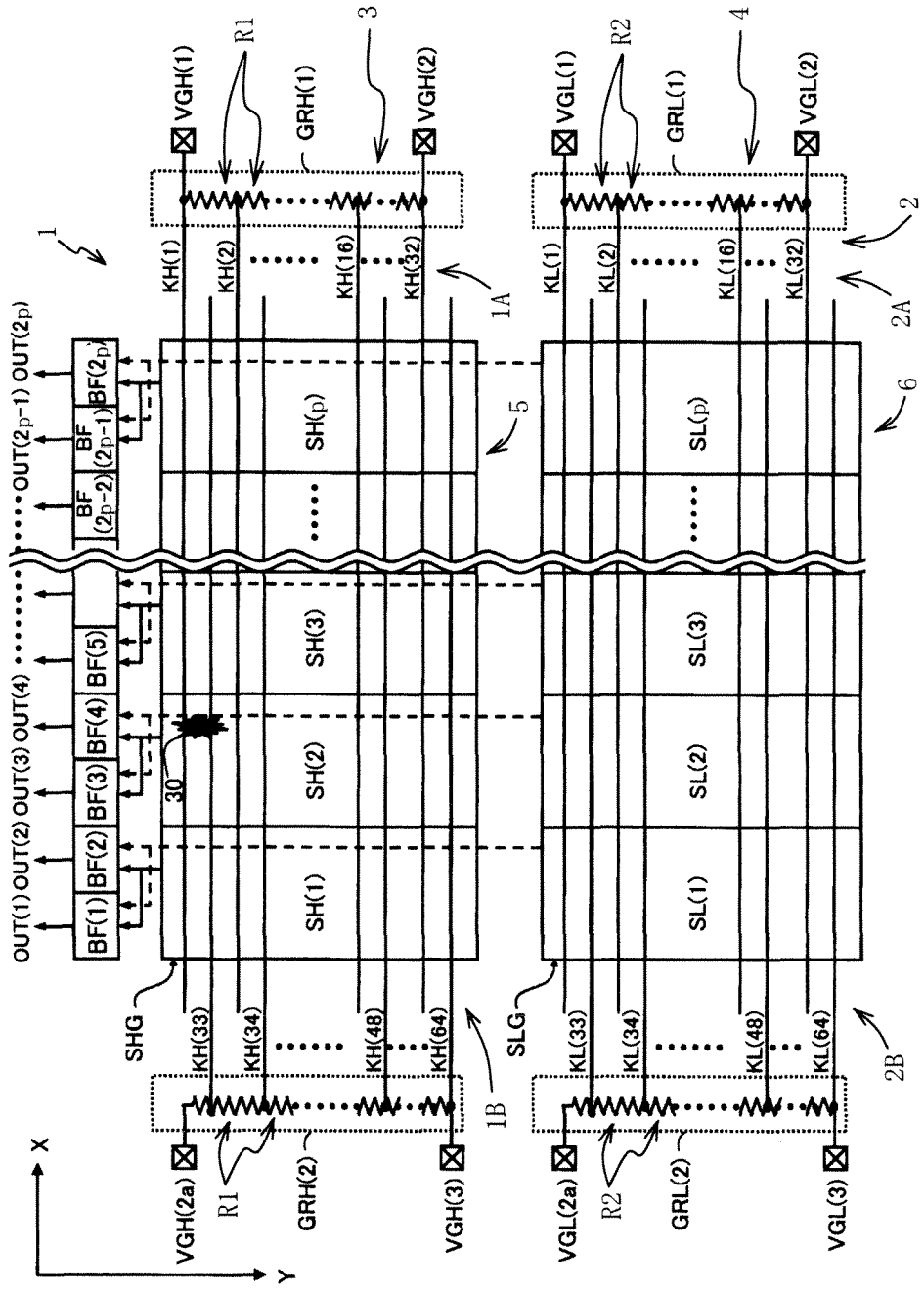
F I G . 3

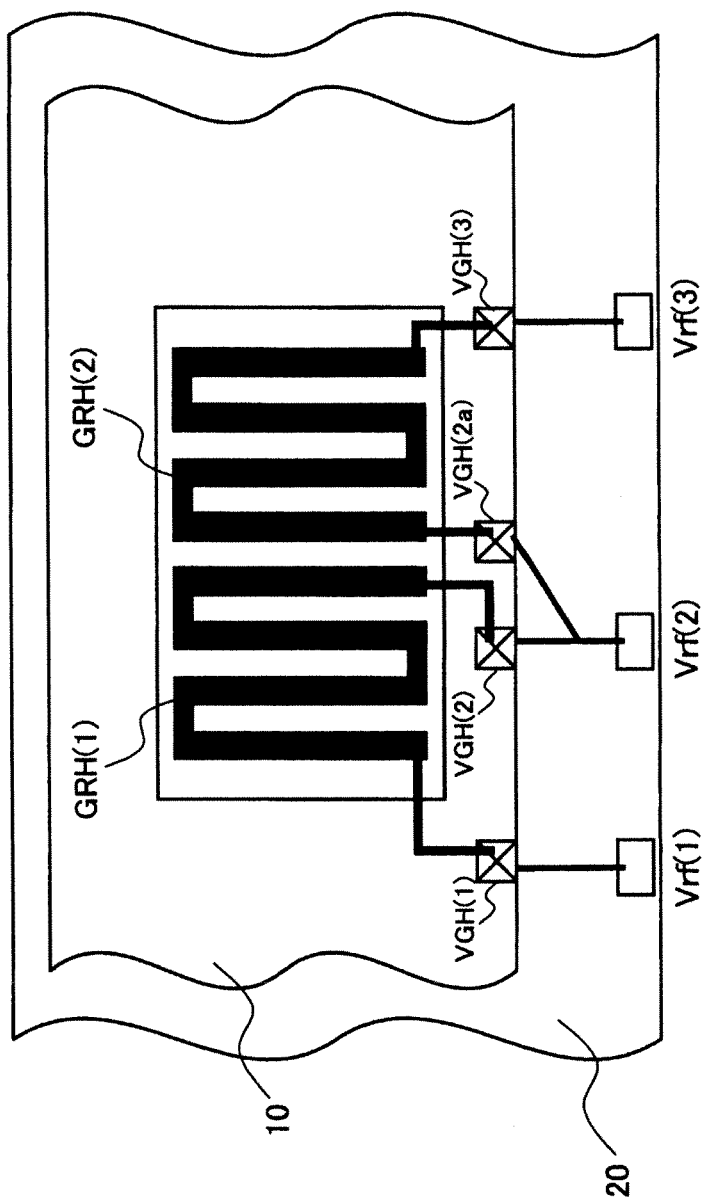
F I G. 5

US 8,570,350 B2

SEMICONDUCTOR INTEGRATED CIRCUIT FOR DRIVING DISPLAY PANEL, DISPLAY PANEL DRIVING MODULE, AND DISPLAY DEVICE

CROSS-REFERENCE TO RELATED APPLICATION

This is a continuation of PCT International Application PCT/JP2010/003804 filed on Jun. 8, 2010, which claims priority to Japanese Patent Application No. 2009-243149 filed on Oct. 22, 2009. The disclosures of these applications including the specifications, the drawings, and the claims are hereby incorporated by reference in their entirety.

FIELD OF THE INVENTION

The present invention relates to a semiconductor integrated circuit configured to drive a display panel such as a liquid crystal display panel, more particularly to a technology mostly developed for a semiconductor integrated circuit adapted to dot inversion driving and capable of reducing a chip area while guaranteeing a good testing facility for testing whether short circuit is occurring between gradation wiring lines due to any failure in a semiconductor manufacturing process. The present invention further relates to a display panel driving module and a display device configured likewise.

BACKGROUND OF THE INVENTION

In recent years, there is an ongoing reduction of frame width in display panels used for OA (Office Automation). More specifically, a frame member circumferentially encompassing a cabinet which holds a display panel body has an increasingly narrower width. Conventionally, signal wiring lines are provided in the frame member having a large width dimension. It is a recent trend to provide the signal wiring lines on the chip side of the display panel so that its frame width is reduced. The ongoing trend, however, structurally complicates a semiconductor integrated circuit configured to drive the display panel, making a test analysis difficult.

A conventional semiconductor integrated circuit configured to drive a display panel is described below. The semiconductor integrated circuit is capable of driving the display panel through dot inversion, wherein there are three gradation reference potential inputs for positive and negative polarities respectively, and the display gradation of a liquid crystal panel has 64 gradation levels, and number outputs for driving liquid crystal particles is 2 p (p is a positive integer number).

FIGS. 6 and 7 are circuit diagrams of a semiconductor integrated circuit configured to drive a display panel according to a prior art 1. The circuit elements illustrated in FIGS. 6 and 7 are described below. KH (1)-KH (64) are gradation wiring lines of positive polarity for supplying gradation potentials VH(1)-VH(64) in 64 gradation levels of positive polarity. KL (1)-KL (64) are gradation wiring lines of negative polarity for supplying gradation potentials VL (1)-VL (64) in 64 gradation levels of negative polarity. These two groups of gradation wiring lines having different polarities are separately arranged in juxtaposition.

GRH (a) is a resistance dividing circuit of positive polarity. The resistance dividing circuit of positive polarity GRH (a) includes a plurality of resistors serially connected to one another. These resistors are respectively provided between the wiring lines adjacent to each other in the 64 gradation wiring lines of positive polarity KH (1)-KH (64). The resistance dividing circuit of positive polarity GRH (a) thus configured generates the gradation potentials VH (1)-VH (64) in 64 gradation levels of positive polarity.

GRL (a) is a resistance dividing circuit of negative polarity. The resistance dividing circuit of negative polarity GRL (a) includes a plurality of resistors serially connected to one another. These resistors are respectively provided between the wiring lines adjacent to each other in the 64 gradation wiring lines of negative polarity KL (1)-KL (64). The resistance dividing circuit of negative polarity GRL (a) thus configured generates the gradation potentials VL (1)-VL (64) in 64 gradation levels of negative polarity.

SH (1)-SH (p) are p number of gradation selector circuits of positive polarity. The gradation selector circuits of positive polarity SH (1)-SH (p) are arranged in juxtaposition along a direction (lateral direction) X where the gradation wiring lines of positive polarity KH (1)-KH (64) are routed. The gradation selector circuits of positive polarity SH (1)-SH (p) are each configured to select one of the gradation potentials VH (1)-VH (64) in 64 gradation levels of positive polarity generated by the gradation wiring lines of positive polarity KH (1)-KH (64).

SL (1)-SL (p) are p number of gradation selector circuits of negative polarity. The gradation selector circuits of negative polarity SL (1)-SL (p) are arranged in juxtaposition along a direction (lateral direction) X where the gradation wiring lines of negative polarity KL (1)-KL (64) are routed. The gradation selector circuits of negative polarity SL (1)-SL (p) are each configured to select one of the gradation potentials VL (1)-VL (64) in 64 gradation levels of negative polarity generated by the gradation wiring lines of negative polarity KL (1)-KL (64).

The p number of gradation selector circuits of positive polarity SH (1)-SH (p) aligned along the lateral direction (gradation wiring routing direction) X are consolidated in one block, constituting a group of gradation selector circuits of positive polarity SHG. Similarly, the p number of gradation selector circuits of negative polarity SL (1)-SL (p) aligned along the lateral direction (gradation wiring routing direction) X are consolidated into a group of gradation selector circuits of negative polarity SLG. The group of gradation selector circuits of positive polarity SHG and the group of gradation selector circuits of negative polarity SLG are provided separately from each other in different regions along a direction where the gradation wiring lines are provided in juxtaposition (direction orthogonal to the gradation wiring routing direction: longitudinal direction).

VGH (1), VGH (2), and VGH (3) are electrode pads for applying a gradation reference potential of positive polarity. More specifically, VGH (1) is an electrode pad directly connected to the most significant gradation wiring line of positive polarity KH (1) in the 64 gradation wiring lines of positive polarity KH (1)-KH (64), VGH (3) is an electrode pad directly connected to the least significant gradation wiring line of positive polarity KH (64), and VGH (2) is an electrode pad directly connected to the intermediate gradation wiring line of positive polarity KH (32).

VGL (1), VGL (2), and VGL (3) are electrode pads for applying a gradation reference potential of negative polarity. More specifically, VGL (1) is an electrode pad directly connected to the most significant gradation wiring line of negative polarity KL (1) in the 64 gradation wiring lines of negative polarity KL (1)-KL (64), VGL (3) is an electrode pad directly connected to the least significant gradation wiring line of negative polarity KL (64), and VGL (2) is an electrode pad directly connected to the intermediate gradation wiring line of negative polarity KL (32).

BF (1)-BF (2p) are buffers each configured to select an output and apply low-impedance conversion to the selected output. The first buffer BF (1) and the second buffer BF (2) are paired with each other. The first buffer BF (1) arbitrarily selects one of outputs of the first gradation selector circuit of positive polarity SH (1) and the first gradation selector circuit of negative polarity SL (1) and applies the low-impedance conversion to the selected output, and then outputs the post-conversion output as a liquid crystal drive output OUT (1). The second buffer BF (2) selects the other one of the outputs of the first gradation selector circuit of positive polarity SH (1) and the first gradation selector circuit of negative polarity SL (1) and applies the low-impedance conversion to the selected output, and then outputs the post-conversion output as a liquid crystal drive output OUT (2).

The third buffer BF (3) and the fourth buffer BF (4) are paired with each other. The third buffer BF (3) arbitrarily selects one of outputs of the second gradation selector circuit of positive polarity SH (2) and the second gradation selector circuit of negative polarity SL (2) and applies the low-impedance conversion to the selected output, and then outputs the post-conversion output as a liquid crystal drive output OUT (3). The fourth buffer BF (4) selects the other one of the outputs of the second gradation selector circuit of positive polarity SH (2) and the second gradation selector circuit of negative polarity SL (2) and applies the low-impedance conversion to the selected output, and then outputs the post-conversion output as a liquid crystal drive output OUT (4).

Similarly, a (2p−1)th buffer BF (2p−1) and a (2p)th buffer BF (2p) are paired with each other. The (2p−1)th buffer BF (2p−1) arbitrarily selects one of outputs of a (p)th gradation selector circuit of positive polarity SH (p) and a (p)th gradation selector circuit of negative polarity SL (p) and applies the low-impedance conversion to the selected output, and then outputs the post-conversion output as a liquid crystal drive output OUT (2p−1). The (2p)th buffer BF (2p) selects the other one of the outputs of the (p)th gradation selector circuit of positive polarity SH (p) and the (p)th gradation selector circuit of negative polarity SL (p) and applies the low-impedance conversion to the selected output, and then outputs the post-conversion output as a liquid crystal drive output OUT (2p).

In the semiconductor integrated circuit thus configured, outputs of a gradation selector circuit of positive polarity SH (i) and a gradation selector circuit of negative polarity SL (i) are inputted to an arbitrary buffer BF (2i), wherein "I" is an arbitrary positive integer (i=1, 2 . . . , p). The gradation selector circuit of positive polarity SH (i) is in proximity to the buffer BF (2i), whereas the gradation selector circuit of negative polarity SL (i) is not in proximity to the buffer BF (2i). To minimize the wiring lines to be routed, therefore, it is desirable to arrange the group of gradation selector circuits of negative polarity SLG as close to the group of gradation selector circuits of positive polarity SHG as possible. This positional arrangement is similarly desirable independent of the polarity, positive or negative.

According to the prior art 1, all of the resistors in the resistance dividing circuit of positive polarity GRH (a) are arranged on the right side of the group of gradation selector circuits of positive polarity SHG facing the drawing, while all of the resistors in the resistance dividing circuit of negative polarity GRL (a) are arranged on the left side of the group of gradation selector circuits of negative polarity SLG facing the drawing. In the illustration of FIG. 6, the 64 gradation wiring lines of positive polarity KH (1)-KH (64) branch from the resistance dividing circuit of positive polarity GRH (a) on the upper side of the drawing and extend rightward and leftward, and the 64 gradation wiring lines of negative polarity KL (1)-KL (64) branch from the resistance dividing circuit of negative polarity GRL (a) on the lower side of the drawing and extend rightward and leftward. In the illustration of FIG. 7, the 64 gradation wiring lines of positive polarity KH (1)-KH (64) branch from the resistance dividing circuit of positive polarity GRH (a) on the right side of the drawing and extend leftward, and the 64 gradation wiring lines of negative polarity KL (1)-KL (64) branch from the resistance dividing circuit of negative polarity GRL (a) on the left side of the drawing and extend rightward.

A consideration is given to current leakage resulting from the occurrence of short circuit between the gradation wiring lines. The gradation wiring lines KH (1)-KL (64) are often very lengthy lines because they are routed in juxtaposition along a relatively long interval between the gradation selector circuit SH (1) and the gradation selector circuit SL (p). Therefore, there is the risk of short circuit between the gradation wiring lines due to any failure in a semiconductor manufacturing process.

FIGS. 8 and 9 illustrate a circuit condition after a short circuit occurred between the gradation wiring lines in the circuit diagrams of FIGS. 6 and 7. A reference numeral 30 indicates the short circuit generated between the gradation wiring lines. When a potential is applied to a terminal as illustrated in FIG. 8 to trace any short circuit between the gradation wiring lines, there is no current flow. When the potential is applied to two terminals as illustrated in FIG. 9, there is a constant current flow, which makes it difficult to determine whether the current results from the short circuit between the gradation wiring lines. When the current leakage is thus checked by simply applying the potential, it is difficult to decide whether the gradation wiring lines are short-circuited, leading to an increase of testing steps. Thus, it is inconvenient to test whether the gradation wiring lines are short-circuited in the prior art 1 illustrated in FIGS. 6 and 7.

FIG. 10 illustrates a circuit improved to more readily check whether the gradation wiring lines are short-circuited by any failure in a semiconductor manufacturing process. The circuit is called a prior art 2 and described below in detail. According to a characteristic of the prior art 2, the layout area of the 64 gradation wiring lines of positive polarity KH (1)-KH (64) and the resistance dividing circuit of positive polarity GRH (a) is enlarged downward facing the drawing, while the layout area of the 64 gradation wiring lines of negative polarity KL (1)-KL (64) and the resistance dividing circuit of negative polarity GRL (a) is enlarged upward facing the drawing. The respective layout areas are thus enlarged so that gradation wiring lines of positive polarity KH (j) extending from the right side facing the drawing toward the center and gradation wiring lines of negative polarity KL (j) extending from the left side facing the drawing toward the center are alternately provided in an indented manner (j=1, 2, . . . , 64). More specifically, the gradation wiring lines of positive polarity KH (j) and the gradation wiring lines of negative polarity KL (j) are alternately provided in the following order; KH (1), KL (1), KH (2), KL (2), KH (3), KL (3), . . . KH (32), KL (32), . . . , KH (64), KL (64).

According to another characteristic of the prior art 2, the layout area of the p number of gradation selector circuits of positive polarity SH (1)-SH (p) according to the prior art 1 is reduced in width but enlarged downward, while the layout area of the p number of gradation selector circuits of negative polarity SL (1)-SL (p) is reduced in width but enlarged upward. Two adjacent ones of the gradation selector circuits of positive polarity and two adjacent ones of the gradation selector circuits of negative polarity are alternately provided (there is one gradation selector circuit at both ends); SH (1), <SL (1), SL(2)>, <SH (2), SH (3)>, <SL (3), SL (4)>, <SH (4), SH (5)>, ..., <SL (p−1), SL (p)>, SH(p).

The second prior art 2 is technically characterized in that one of the gradation wiring lines adjacent to each other in the gradation wiring juxtaposition direction Y is the gradation wiring line of positive polarity KH (j) extending from the resistance dividing circuit of positive polarity GRH (a) on the right side, while the other one of the gradation wiring lines adjacent to each other in the gradation wiring juxtaposition direction Y is the gradation wiring line of negative polarity KL (j) extending from the resistance dividing circuit of negative polarity GRL (a) on the left side (j=1, 2, ..., 64). Thus, the gradation wiring lines of positive polarity and the gradation wiring lines of negative polarity are alternately provided.

Next is described a method of measuring a leak current generated between the gradation wiring lines of positive polarity KH (1)-KH (64) and the gradation wiring lines of negative polarity KL (1)-KL (64). A potential of positive polarity is applied to any of the electrode pads VGH (1)-VGH (3) to which the gradation reference potential of positive polarity is inputted, while a potential of negative polarity is applied is applied to any of the electrode pads VGL (1)-VGL (3) to which the gradation reference potential of negative polarity is inputted. If the adjacent ones of the gradation wiring lines of positive polarity KH (j) extending from the right side and the gradation wiring lines of negative polarity KL (j) or KL (j−1) extending from the left side are undergoing short circuit, the leak current flows between an electrode pad VGH (x) to which the gradation reference potential of positive polarity is applied and an electrode pad VGL (y) to which the gradation reference potential of negative polarity is applied. Then, it is known from the leak current flow that the short circuit is occurring between the gradation wiring lines (x=1, 2, 3, y=1, 2, 3).

The method of measuring the leak current described so far can easily check whether the gradation wiring lines are undergoing short circuit due to any failure in a semiconductor manufacturing process. As far as the gradation wiring lines adjacent to each other are in normal condition with no short circuit therebetween, there is no current flow therebetween because they are electrically insulated from each other. Thus, whether there is a leak current (whether the gradation wiring lines are short-circuited) is determined based on the recognition that an abnormal condition should be suspected in the event of any current flow that cannot occur in normal condition.

PRIOR ART DOCUMENT

Patent Document

Patent Document 1: Unexamined Japanese Patent Applications Laid-Open No. 2004-61805

SUMMARY OF THE INVENTION

Problem to be Solved by the Invention

According to the circuit configuration of the prior art 2 wherein the gradation wiring lines of positive polarity KH (j) and the gradation wiring lines of negative polarity KL (j) are alternately provided, the p number of gradation selector circuits of positive polarity SH (1)-SH (p) and the p number of gradation selector circuits of negative polarity SL (1)-SL (p) are provided extensively in the whole area where the gradation wiring lines of positive polarity KH (1)-KH (64) and the gradation wiring lines of negative polarity KL (1)-KL (64) are mixedly provided. Thus, the gradation selector circuits of positive polarity SH (1)-SH (p) and the gradation selector circuits of negative polarity SL (1)-SL (p) take up a lengthy area along the gradation wiring juxtaposition direction Y. Further, the gradation selector circuits of positive polarity SH (i) and the gradation selector circuits of negative polarity SL (i) are mixedly provided in the lateral direction (gradation wiring routing direction) in which a pair of gradation selector circuits SH (i) and SL (i) is repeated. The number of the gradation selector circuits of positive polarity SH (i) and the number of gradation selector circuits of negative polarity SL (i) are respectively called, for example, p (positive integer number). Then, p×2 gradation selector circuits of positive and negative polarities in total are lined up. This naturally increases the layout area of the gradation selector circuits.

The prior art 2, wherein a row of gradation selector circuits is the mixture of the gradation selector circuits of positive polarity SH (i) and the gradation selector circuits of negative polarity SL (i), demands the formation of regions for isolating the different polarities in a boundary region between the gradation selector circuits of positive polarity SH (i) and the gradation selector circuits of negative polarity SL (i). Therefore, it is necessary to provide spaces for P-N isolation regions SR (1), SR (2), ..., SR (p), resulting in an increase of chip area.

In design rules which regulates interline width and line width, a circuit area is determined by factors associated with wiring region and factors associated with diffusion region. Any of the determinative factors which more affects the circuit area consequently decides the whole area of the semiconductor integrated circuit.

In the manufacturing process technique conventionally employed, more emphasis is placed on the factors associated with diffusion region because it is a priority issue to increase a diffusion region for transistors, and the chip area is mostly decided by the factors associated with diffusion region. Therefore, it was not really necessary to take into account the factors associated with wiring region (to design a smaller wiring region). However, improvements of the manufacturing process technique in recent years have reduced the diffusion region, making it a critical issue to accomplish a design in which the factors associated with wiring region are more heavily weighed so that the circuit area is reduced.

However, such a circuit design that stresses the factors associated with wiring region is a difficult task in the prior art 2 wherein the layout area of the gradation selector circuits is increased. The prior art 2 further includes difficulty in considering the factors associated with diffusion region because it is necessary to ensure a number of P-N isolation regions SR (1)-SR (p), resulting in an inevitable increase of the diffusion region.

The present invention was accomplished to solve the conventional technical problems, and a main object thereof is to avoid an area increase of wiring and diffusion regions to reduce a chip area. Another object of the present invention is to guarantee a good testing facility for testing whether gradation wiring lines are short-circuited due to any failure in a semiconductor manufacturing process while succeeding in the chip area reduction.

Means for Solving the Problem

The present invention provides a semiconductor integrated circuit configured to drive a display panel technically advantageous as described below. A semiconductor integrated circuit according to the present invention comprises:

a group of gradation wiring lines of positive polarity including a plurality of gradation wiring lines of positive polarity arranged in juxtaposition;

a resistance dividing circuit of positive polarity including a plurality of first voltage dividing resistors serially connected to each other, the resistance dividing circuit of positive polarity generating gradation potentials of positive polarity dependent upon resistance values of the first voltage dividing resistors in the gradation wiring lines of positive polarity by providing the first voltage dividing resistors between the gradation wiring lines of positive polarity;

a group of gradation selector circuits of positive polarity including a plurality of gradation selector circuits of positive polarity arranged in juxtaposition between the gradation wiring lines of positive polarity or along a direction where the gradation wiring lines of positive polarity extend, the gradation selector circuits of positive polarity each selecting one of the group of gradation wiring lines of positive polarity to fetch a gradation potential of positive polarity from the selected gradation wiring line of positive polarity;

a group of gradation wiring lines of negative polarity including a plurality of gradation wiring lines of negative polarity arranged in juxtaposition in parallel with the gradation wiring lines of positive polarity;

a resistance dividing circuit of negative polarity including a plurality of second voltage dividing resistors serially connected to each other, the resistance dividing circuit of negative polarity generating gradation potentials of negative polarity dependent upon resistance values of the second voltage dividing resistors in the gradation wiring lines of negative polarity by providing the second voltage dividing resistors between the gradation wiring lines of negative polarity; and a group of gradation selector circuits of negative polarity including a plurality of gradation selector circuits of negative polarity arranged in juxtaposition between the gradation wiring lines of negative polarity or along a direction where the gradation wiring lines of negative polarity extend, the gradation selector circuits each selecting one of the group of gradation wiring lines of negative polarity to fetch a gradation potential of negative polarity from the selected gradation wiring line of negative polarity.

In the semiconductor integrated circuit according to the present invention thus configured, the group of gradation wiring lines of positive polarity and the resistance dividing circuit of positive polarity are associated with the group of gradation selector circuits of positive polarity, and the group of gradation wiring lines of negative polarity and the resistance dividing circuit of negative polarity are associated with the group of gradation selector circuits of negative polarity. The resistance dividing circuit and the group of gradation wiring lines of positive polarity and the resistance dividing circuit and the group of gradation wiring lines of negative polarity are respectively divided into different groups.

The configuration of the structural elements of positive polarity is described.

The group of gradation wiring lines of positive polarity is divided into first –(n) th groups of wiring lines of positive polarity including a (m)th group of wiring lines of positive polarity and a (m+1)th group of wiring lines of positive polarity (n is a positive integer number meeting 2≤n, m is a positive integer number meeting 1≤m≤n−1).

The gradation wiring lines of positive polarity constituting the (m)th group of wiring lines of positive polarity and the gradation wiring lines of positive polarity constituting the (m+1)th group of wiring lines of positive polarity are alternately provided.

The resistance dividing circuit of positive polarity is divided into first –(n) th resistance dividing circuits of positive polarity.

The first –(n) th resistance dividing circuits of positive polarity include (m)th resistance dividing circuits of positive polarity provided between the gradation wiring lines of positive polarity or on one end side of the direction where the gradation wiring lines of positive polarity extend and connected to the (m)th group of wiring lines of positive polarity, and (m+1)th resistance dividing circuits of positive polarity provided between the gradation wiring lines of positive polarity or on the other end side of the direction where the gradation wiring lines of positive polarity extend and connected to the (m+1)th group of wiring lines of positive polarity.

The configuration of the structural elements of negative polarity is described.

The group of gradation wiring lines of negative polarity is divided into first –(n')th groups of wiring lines of negative polarity including a (m')th group of wiring lines of negative polarity and a (m'+1)th group of wiring lines of negative polarity (n' is a negative integer number meeting 2≤n', m' is a negative integer number meeting 1≤m'n'−1).

The gradation wiring lines of negative polarity constituting the (m')th group of wiring lines of negative polarity and the gradation wiring lines of negative polarity constituting the (m'+1)th group of wiring lines of negative polarity are alternately provided.

The resistance dividing circuit of negative polarity is divided into first –(n')th resistance dividing circuits of negative polarity.

The first –(n')th resistance dividing circuits of negative polarity include (m')th resistance dividing circuits of negative polarity provided between the gradation wiring lines of negative polarity or on one end side of the direction where the gradation wiring lines of negative polarity extend and connected to the (m')th group of wiring lines of negative polarity, and (m'+1)th resistance dividing circuits of negative polarity provided between the gradation wiring lines of negative polarity or on the other end side of the direction where the gradation wiring lines of negative polarity extend and connected to the (m'+1)th group of wiring lines of negative polarity.

According to the prior art 2, the gradation wiring lines of positive polarity and the gradation wiring lines of negative polarity are alternately provided. The present invention is different to the prior art 2 in that the gradation wiring lines of positive polarity are provided one after the other, and the gradation wiring lines of negative polarity are provided one after the other, separately from each other. According to the prior art 1, the group of gradation wiring lines of positive polarity and the group of gradation wiring lines of negative polarity are separately arranged in juxtaposition, and the resistance dividing circuits of positive and negative polarities are provided on one side of the respective groups of gradation selector circuits. In contrast, the present invention is technically characterized in that the resistance dividing circuits of positive and negative polarities are provided on both sides of the respective groups of gradation selector circuits. These are the differences between the present invention and the prior arts 1 and 2.

According to the present invention, the gradation wiring lines of the same polarity, positive or negative, are provided next to each other, however, different voltage levels can be applied to the gradation wiring lines next to each other. To check any current leakage, therefore, voltages having different potentials are respectively applied to the resistance dividing circuit of positive polarity (or negative polarity) on one side and the resistance dividing circuit of negative polarity (or positive polarity) on the other side. Then, there is a leak current flow between the adjacent gradation wiring lines as far as they are undergoing short circuit. It can be determined that the gradation wiring lines are short-circuited by detecting the leak current thus generated. There is no current flow between the gradation wiring lines next to each other in normal condition (no short circuit therebetween) because they are electrically insulated from each other. Thus, possible short circuit between the gradation wiring lines can be tested by determining whether there is any leak current. This testing technique may appear to be somewhat similar to the prior art 2, however, includes the following differences.

According to the prior art 2 wherein the gradation wiring lines of positive polarity and the gradation wiring lines of negative polarity are alternately provided, the gradation selector circuits of positive polarity and the gradation selector circuits of negative polarity are provided extensively in the whole area where the gradation wiring lines of positive polarity and the gradation wiring lines of negative polarity are mixedly provided. Thus, the gradation selector circuits of positive polarity and the gradation selector circuits of negative polarity take up a lengthy area along the gradation wiring juxtaposition. Further, the gradation selector circuits of positive polarity and the gradation selector circuits of negative polarity are mixedly, more specifically, alternately provided in the gradation wiring routing direction (gradation wiring extending direction). Expressing the number of the gradation selector circuits of positive polarity and the number of the gradation selector circuits of negative polarity as p (p is a positive integer number), the prior art 2, wherein the gradation selector circuits of different polarities are alternately repeated, results in a row of p×2 number of gradation selector circuits of positive and negative polarities. The present invention, however, provides a row of gradation selector circuits of positive polarity and a row of gradation selector circuits of negative polarity, separately, and the gradation selector circuits of two different polarities provided in the respective rows are n and n'. Because of the structural advantage, the present invention can reduce an area taken up by the gradation selector circuits along the gradation wiring routing direction (longitudinal direction).

According to the prior art 2 wherein a row of gradation selector circuits is the mixture of the gradation selector circuits of positive and negative polarities, it is necessary to form regions for isolating the different polarities in a boundary region between the gradation selector circuits of positive polarity and the gradation selector circuits of negative polarity when the gradation selector circuits are formed during the diffusion step of a semiconductor manufacturing process. The prior art 2 which demands the formation of these regions inevitably increases the chip area. In contrast, the present invention is technically characterized in that the gradation wiring lines intersecting with each other have the same polarity, and the gradation selector circuits of positive polarity and the gradation selector circuits of negative polarity are respectively provided in their dedicated regions separately provided. Thus, the gradation wiring lines of positive and negative polarities do not mingle with each other, making it unnecessary to provide the isolation regions. This reduces the chip area as compared to the prior art 2.

According to the prior art 1 wherein the gradation wiring lines next to each other (having the same polarity) are connected by the voltage dividing resistor, it is not possible to discriminate whether a current flow, if any, results from the short-circuited gradation wiring lines. On the other hand, the present invention is different to the prior art 1 in that there is no current flow between the gradation wiring lines next to each other in normal condition (no short circuit) because they are electrically insulated from each other. Thus, possible short circuit between the gradation wiring lines can be tested by determining whether there is any leak current.

The gradation wiring lines of positive and negative polarities and the resistance dividing circuits of positive and negative polarities are respectively divided into an arbitrary number of groups, for example, into even-numbered groups or odd-numbered groups. In exemplary embodiments of the present invention described later, they are divided into two groups (n, n'=2), however, they may be divided into four groups (n, n'=4), eight groups (n, n'=8), or 16 groups (n, n'=16). In the case of dividing the gradation wiring lines into two groups, first and second resistance dividing circuits are respectively provided at intermediate positions in a group of gradation selector circuits, or the first resistance dividing circuits are provided on one end side of a group of gradation selector circuits and the second voltage dividing selector circuits are provided on the other end side of the group of gradation selector circuits as illustrated in FIG. 3. In the case of dividing the gradation wiring lines into four groups, the first and third resistance dividing circuits are provided on one end side of a group of gradation selector circuits and second and fourth dividing selector circuits are provided on the other end side of the group of gradation selector circuits. In the case of dividing the gradation wiring lines into odd-numbered groups, for example, three groups as illustrated in FIG. 2, of the resistance dividing circuits of positive polarity, high-potential resistance dividing circuits are called GRH (A), and gradation wiring lines of positive polarity connected to GRH (A) and arranged in juxtaposition are called KH (1)-(22), intermediate-potential resistance dividing circuits are called GRH (B), and gradation wiring lines of positive polarity connected to GRH (B) and arranged in juxtaposition are called KH (23)-(43), low-potential resistance dividing circuits are called GRH (C), and gradation wiring lines of positive polarity connected to GRH (C) and arranged in juxtaposition are called KH (44)-(64) (there are 64 gradation wiring lines according to exemplary embodiments of the present invention), and then, the gradation wiring lines are arranged in the order of KH (1), KH (23), KH (44), KH (2), . . . . As a result, the adjacent gradation wiring lines are routed through the different resistance dividing circuits. This is an effective configuration as well.

In any of the suggested configurations, the present invention can not only sustain a good testing facility for checking whether the gradation wiring lines are short-circuited due to any failure in a semiconductor manufacturing process but also prevent an area increase of the wiring and isolation regions, thereby succeeding in reduction of the chip area.

The technology provided by the present invention described so far can be applied to a display panel driving module and a display device as follows.

A display panel driving module according to the present invention comprises:

the semiconductor integrated circuit according to the present invention, and a package in which the semiconductor integrated circuit is implemented, wherein the resistance dividing circuits of positive polarity and the resistance dividing circuits of negative polarity are implemented in series in the package.

A display device according to the present invention comprises:
the semiconductor integrated circuit according to the present invention, and a display panel in which the semiconductor integrated circuit is implemented, wherein
the resistance dividing circuits of positive polarity and the resistance dividing circuits of negative polarity are implemented in series in the display panel.

Because the resistance dividing circuits of positive and negative polarities are both dividingly provided, it is necessary to connect the resistance dividing circuits in series to each other so that the multiple resistance dividing circuits can behave as an integrative resistance dividing circuit. However, it is generally more difficult to connect the resistance dividing circuits in series inside the semiconductor integrated circuit than connecting them outside the semiconductor integrated circuit. In the display device according to the present invention, therefore, the resistance dividing circuits are connected in series outside the semiconductor integrated circuit. An example of the outside connection is to connect the resistance dividing circuits on the package in which the semiconductor integrated circuit is implemented, and another example is to connect the resistance dividing circuits on the display device in which the semiconductor integrated circuit is implemented.

The semiconductor integrated circuit for display panel drive according to the present invention can be more advantageously configured as follows. The semiconductor integrated circuit for display panel drive according to the present invention is preferably provided with first electrode pads on both end sides of the first –(n) th resistance dividing circuits of positive polarity, and electrode pads on both end sides of the first –(n) th resistance dividing circuits of negative polarity. When the electrode pads are thus provided, voltage can be applied to any of the resistance dividing circuits from outside the semiconductor integrated circuit by way of the electrode pads.

The present invention preferably takes into account a voltage drop resulting from resistance components generated between the first –(n) th resistance dividing circuits of positive polarity and the first electrode pads when setting resistances values of the first voltage dividing resistors constituting the first –(n) th resistance dividing circuits of positive polarity, and takes into account a voltage drop resulting from resistance components generated between the first –(n')th resistance dividing circuits of negative polarity and the second electrode pads when setting resistances values of the second voltage dividing resistors constituting the first –(n')th resistance dividing circuits of negative polarity.

A resistance component that cannot be overlooked is possibly generated in any of the wiring lines between end portions of the resistance dividing circuits and the electrode pads. Such a resistance component results in the occurrence of an error in a desirable voltage division between the resistance dividing circuits, consequently generating a shift in a gamma characteristic curve. The technique described in this section takes into account the resistance values generated in the wiring lines routed between the end portions of the resistance dividing circuits and the electrode pads when adjusting the resistance values of the resistance dividing circuits so that the resistance values are reflected on the end portions of the resistance dividing circuits. As a result, the voltage division is carried out as previously planned to avoid any shift in the gamma characteristic curve.

Effect of the Invention

The present invention can succeed in controlling an area increase of wiring and diffusion regions, which was conventionally infeasible, so that reduction of a chip area is accomplished, while guaranteeing a good testing facility for checking whether gradation wiring lines are short-circuited due to any failure in a semiconductor manufacturing process.

BRIEF DESCRIPTION OF THE DRAWINGS

FIG. 3 is a circuit diagram 3 illustrating the configuration of the semiconductor integrated circuit for display panel drive according to the exemplary embodiment 1.

FIG. 5 is a conceptual view of a main section of a display panel driving module or a display device according to an exemplary embodiment 2 of the present invention.

EXEMPLARY EMBODIMENTS FOR CARRYING OUT THE INVENTION

Exemplary Embodiment 1

In exemplary embodiments 1 and 2 of the present invention described below (and in the Scope of Claims), n, n', m, m', and p are all positive integer numbers, and such ordinal numbers as (n) th and (n+1)th express an arrangement order of equivalent elements disposed in juxtaposition. Further, (n) th and (n+1)th, and (n−1)th and (n) th respectively express that the elements with these prefix numbers are adjacent to each other in the arrangement order.

A semiconductor integrated circuit for display panel drive according to the exemplary embodiments is adapted to dot inversion driving, wherein there are three gradation reference potential inputs on positive and negative polarities respectively, and the display gradation of a liquid crystal panel is 64 gradation levels during normal use, but four gradation reference potential inputs are used on the positive and negative polarities to test whether any gradation wiring lines are short-circuited.

Figure 1:
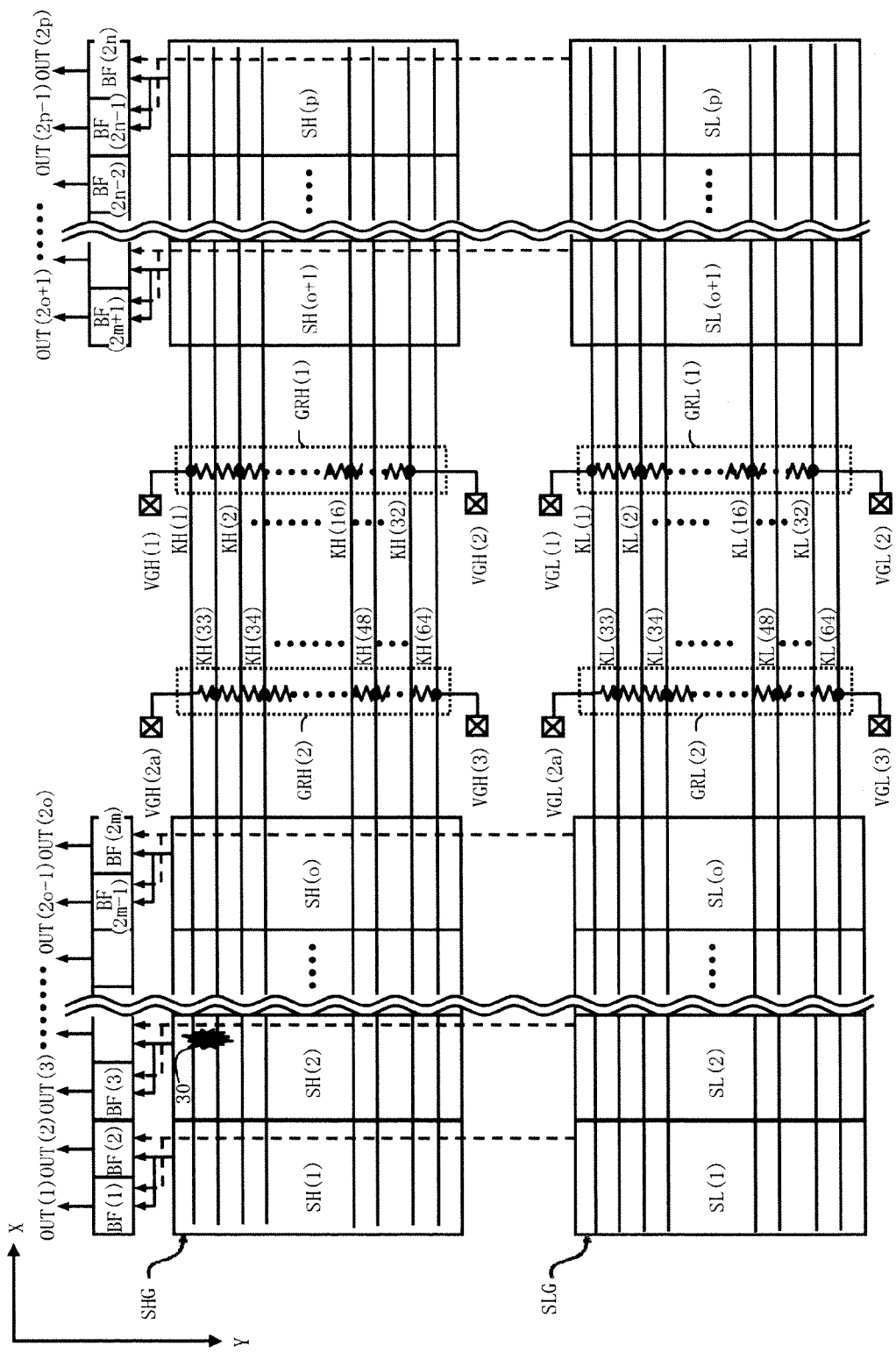
FIG. 1 is a circuit diagram 1 illustrating a configuration of a semiconductor integrated circuit for display panel drive according to an exemplary embodiment 1 of the present invention.
Figure 2:
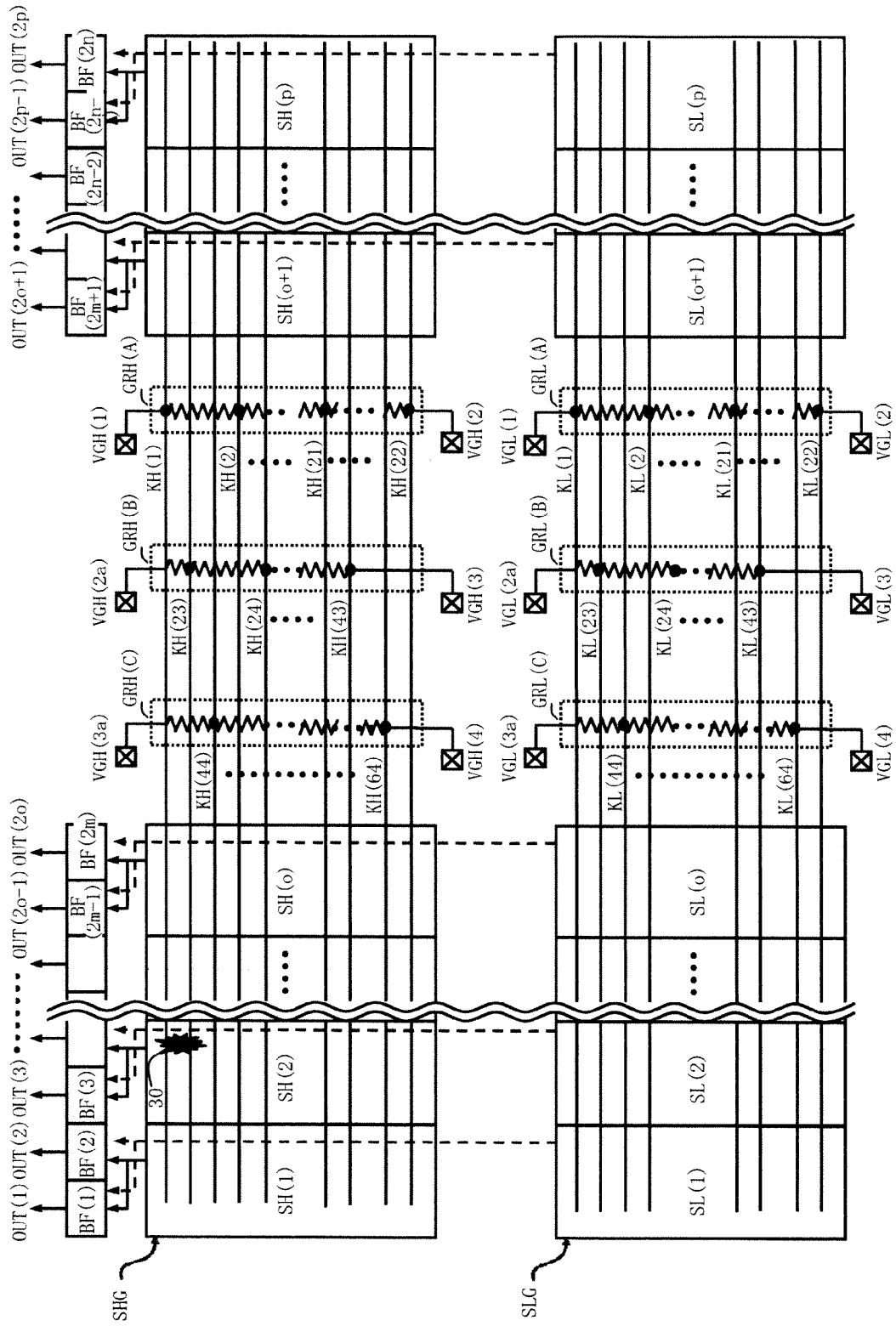
FIG. 2 is a circuit diagram 2 illustrating the configuration of the semiconductor integrated circuit for display panel drive according to the exemplary embodiment 1.

FIGS. 1 and 3 are circuit diagrams illustrating a configuration of a semiconductor integrated circuit for display panel drive according to an exemplary embodiment 1 of the present invention. The semiconductor integrated circuit is provided with a group of gradation wiring lines of positive polarity 1, a group of gradation wiring lines of negative polarity 2, a resistance dividing circuit of positive polarity 3, a resistance dividing circuit of negative polarity 4, n number of gradation selector circuits of positive polarity SH (1)-SH (n), n number of gradation selector circuits of negative polarity SL (1)-SL (n), electrode pads VGH (1), VGH (2), VGH (2a), and VGH (3) for applying a gradation reference potential of positive polarity, electrode pads VGL (1), VGL (2), VGL (2a), and VGL (3) for applying a gradation reference potential of negative polarity, and p number of buffers BF (1)-BF (2p) each configured to select an output and apply low-impedance conversion to the selected output.

The group of gradation wiring lines of positive polarity 1 includes a plurality of gradation wiring lines of positive polarity KH (1)-KH (64) arranged in juxtaposition (64 wiring lines in the present exemplary embodiment). The group of gradation wiring lines of positive polarity 2 includes a plurality of gradation wiring lines of negative polarity KL (1)-KL (64) arranged in juxtaposition and in parallel with the gradation wiring lines of positive polarity KH (1)-KH (64) (64 wiring lines in the present exemplary embodiment).

The configuration of the structural elements of positive polarity is described. The group of gradation wiring lines of positive polarity 1 is divided into n number of groups (n is a positive integer number equal to or larger than 2, n=2 according to the present exemplary embodiment). More specifically, the group of gradation wiring lines of positive polarity 1 is divided into a first group of wiring lines of positive polarity 1A and a second group of wiring lines of positive polarity 1B. The gradation wiring lines of positive polarity KH (1)-KH (32) constituting the first group of wiring lines of positive polarity 1A and the gradation wiring lines of positive polarity KH (33)-KH (64) constituting the second group of wiring lines of positive polarity 1B are alternately provided. More specifically, the first group of wiring lines of positive polarity 1A and the second group of wiring lines of positive polarity 1B are alternately provided in the order of KH (1), KH (33), KH (2), KH (34), KH (3), KH(35), . . . , KH (31), KH(63), KH (32), KH (64). The combination of the first group of gradation wiring lines of positive polarity 1A and the second group of gradation wiring lines of positive polarity 1B forms the group of gradation wiring lines of positive polarity 1. According to the present exemplary embodiment, the first group of wiring lines of positive polarity 1A includes a (m)th group of wiring lines of positive polarity, and the second group of wiring lines of positive polarity 1B includes a (m+1)th group of wiring lines of positive polarity. The number of the wiring lines included in the group of gradation wiring lines of positive polarity 1 is set equally to the gradation levels (64 gradation levels in the given example).

The resistance dividing circuit of positive polarity 3 is divided into n number of groups (two groups according to the present exemplary embodiment). The resistance dividing circuit of positive polarity 3 is divided into a first resistance dividing circuit of positive polarity GRH (1) and a second resistance dividing circuit of positive polarity GRH (2). The first resistance dividing circuit of positive polarity GRH (1) is provided at an intermediate position in the group of gradation wiring lines of positive polarity 1 or on one end side of a direction where the group of gradation wiring lines of positive polarity 1 extends. The second resistance dividing circuit of positive polarity GRH (2) is provided at an intermediate position in the group of gradation wiring lines of positive polarity 1 or on the other end side of the wiring line extending direction. According to the present exemplary embodiment, the first resistance dividing circuit of positive polarity GRH (1) includes (m)th resistance dividing circuits of positive polarity, and the second resistance dividing circuit of positive polarity GRH (2) includes (m+1)th resistance dividing circuits of positive polarity.

The first resistance dividing circuit of positive polarity GRH (1) is connected to the first group of wiring lines of positive polarity 1A ((m)th group of wiring lines of positive polarity). In the first resistance dividing circuit of positive polarity GRH (1), first voltage dividing resistors R1 connected in series to one another are respectively provided between the gradation wiring lines of positive polarity KH (1)-KH (32), so that gradation potentials of positive polarity dependent upon resistance values of the first voltage dividing resistors R1 are generated in the gradation wiring lines of positive polarity KH (1)-KH (32).

The second resistance dividing circuit of positive polarity GRH (2) is connected to the second group of wiring lines of positive polarity 1B ((m+1)th group of wiring lines of positive polarity). Similarly to the first resistance dividing circuit of positive polarity GRH (1), f first voltage dividing resistors R1 connected in series to each other are respectively provided between the gradation wiring lines of positive polarity KH (33)-KH (64) in the second resistance dividing circuit of positive polarity GRH (2), so that gradation potentials of positive polarity dependent upon resistance values of the first voltage dividing resistors R1 are generated in the gradation wiring lines of positive polarity KH (33)-KH (64).

A group of gradation selector circuits of positive polarity 5 includes p number of (p is a positive integer number equal to or larger than 2) gradation selector circuits of positive polarity SH (1)-SH (p) arranged in juxtaposition at intermediation positions in the group of gradation wiring lines of positive polarity 1 or a direction where the group of gradation wiring lines of positive polarity 1 extends (lateral direction facing the drawing which is a gradation wiring routing direction) X. The "p" which is the number of the gradation selector circuits of positive polarity SH (1)-SH (p) is equal to or smaller than the number of the wiring lines included in the group of gradation wiring lines of positive polarity 1 (64 according to the present exemplary embodiment). The gradation selector circuits of positive polarity SH (1)-SH (p) are respectively configured to select a gradation wiring line of positive polarity KH (x) from the group of gradation wiring lines of positive polarity 1 to fetch a gradation potential of positive polarity from the selected gradation wiring line of positive polarity KH (x).

The electrode pad VGH (1) is directly connected to one end of the gradation wiring line of positive polarity KH (1) (end of the wiring line on the side of the first resistance dividing circuit of positive polarity GRH (1)) which is the most significant wiring line in the first group of wiring lines of positive polarity 1A. The electrode pad VGH (2) is directly connected to one end of the gradation wiring line of positive polarity KH (32) (end of the wiring line on the side of the first resistance dividing circuit of positive polarity GRH (1)) which is the least significant wiring line in the first group of wiring lines of positive polarity 1A.

The electrode pad VGH (2a) is directly connected to the other end of the gradation wiring line of positive polarity KH (33) (end of the wiring line on the side of the second resistance dividing circuit of positive polarity GRH (2)) which is the most significant wiring line in the second group of wiring lines of positive polarity 1B. The electrode pad VGH (3) is directly connected to the other end of the gradation wiring line of positive polarity KH (64) (end of the wiring line on the side of the second resistance dividing circuit of positive polarity GRH (2)) which is the least significant wiring line in the second group of wiring lines of positive polarity 1B. When these electrode pads are thus connected, voltages having an equal potential can be applied to the electrode pad VGH (2) connected to the least significant wiring line in the first group of wiring lines of positive polarity 1A and the electrode pad VGH (2a) connected to the most significant wiring line in the second group of wiring lines of positive polarity 1B (which is not illustrated in FIGS. 1 and 3 and will be described in detail later).

Figure 6:
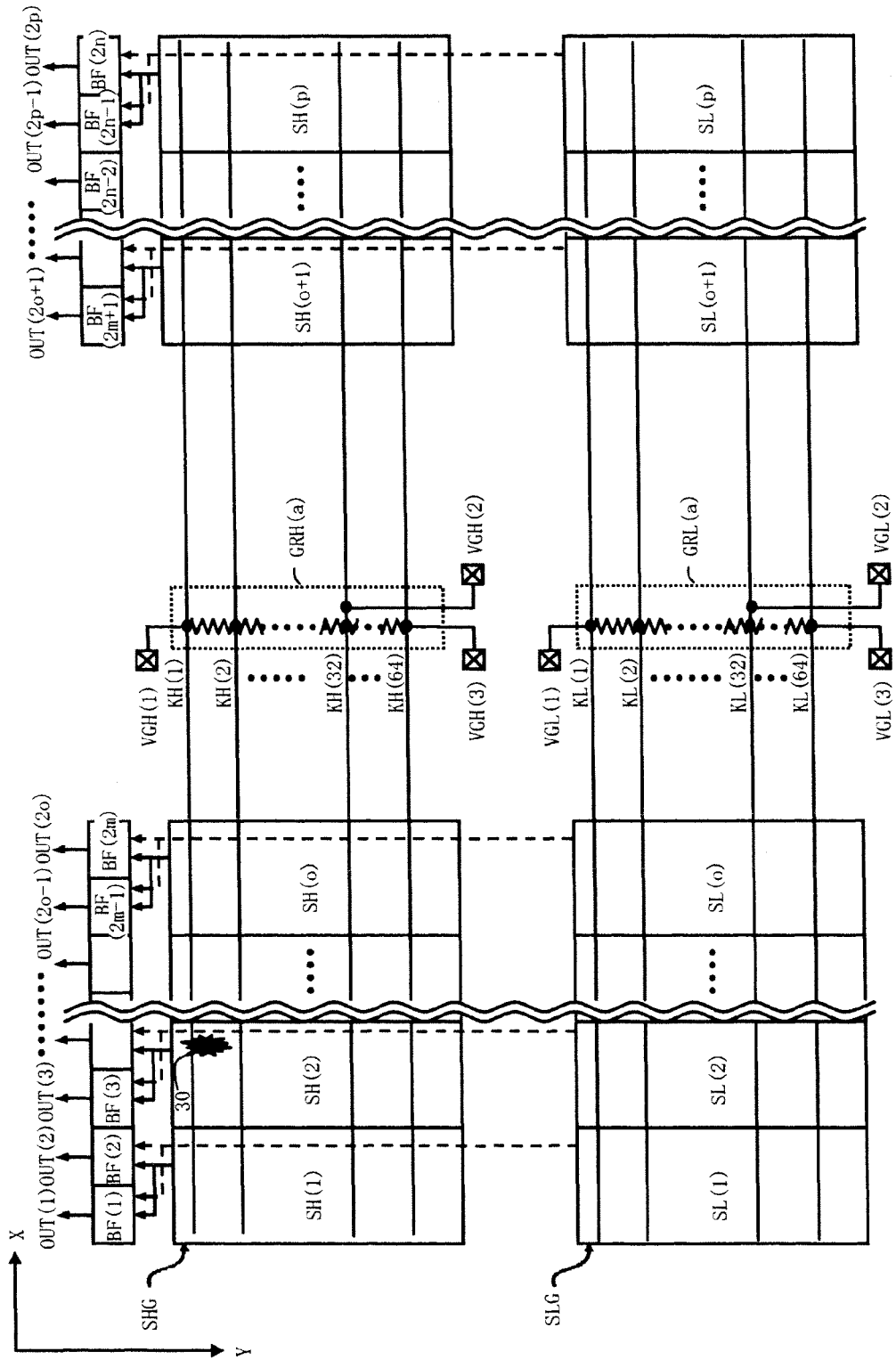
FIG. 6 is a circuit diagram 1 illustrating a configuration of a semiconductor integrated circuit for display panel drive according to a prior art 1.
Figure 7:
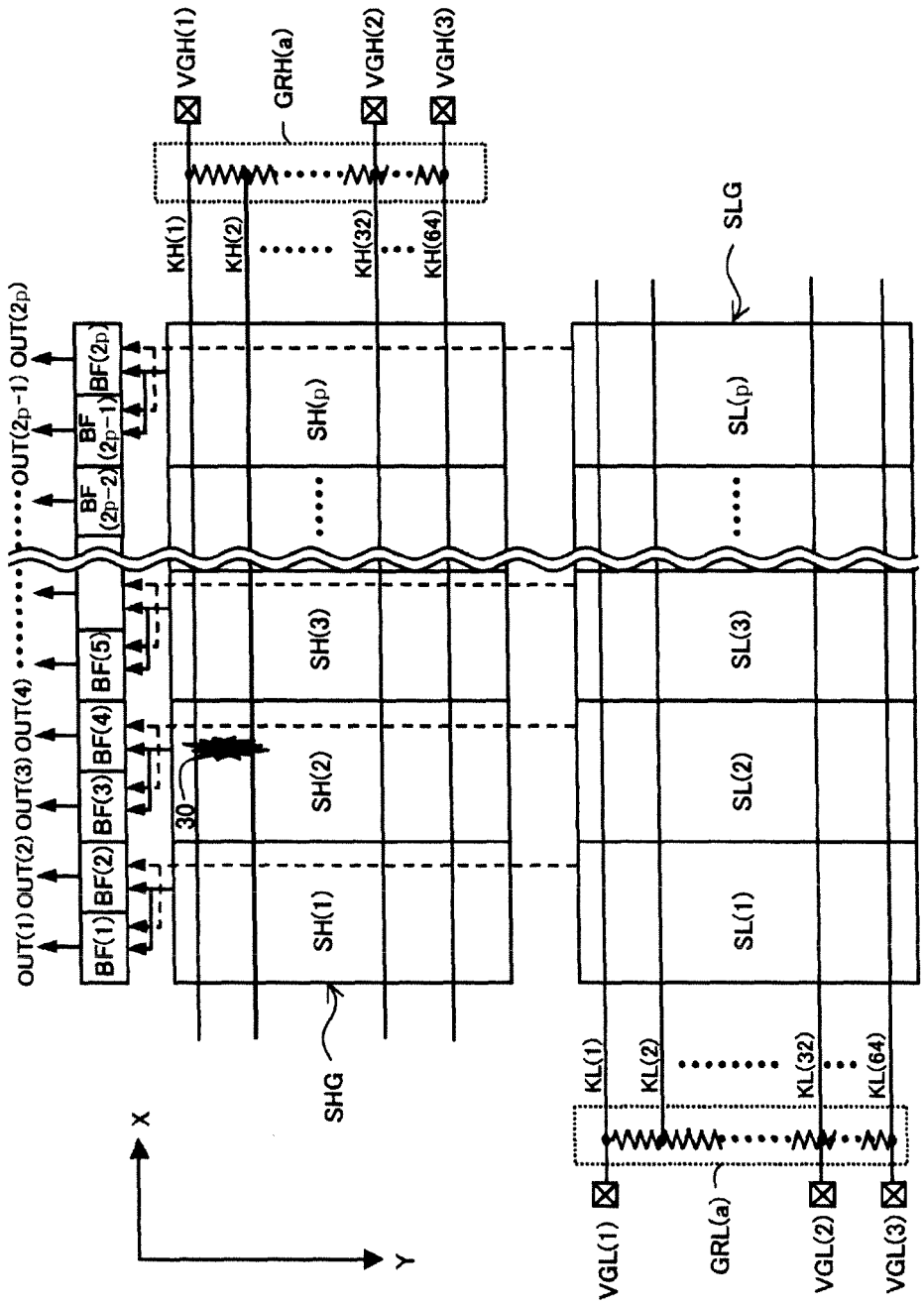
FIG. 7 is a circuit diagram 2 illustrating the configuration of the semiconductor integrated circuit for display panel drive according to the prior art 1.
Figure 8:
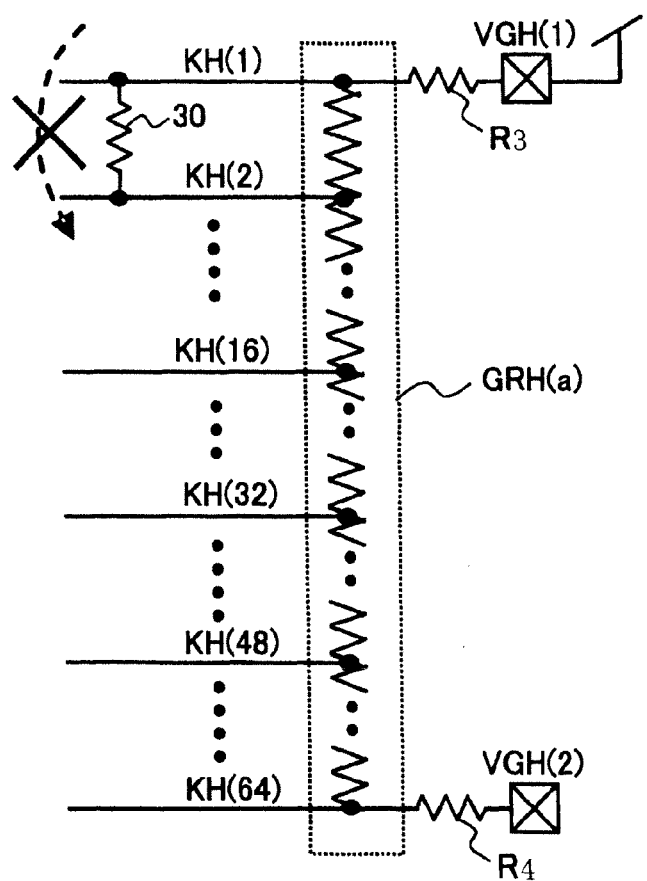
FIG. 8 is an illustration 1 of an operation of the semiconductor integrated circuit for display panel drive according to the prior art 1.
Figure 9:
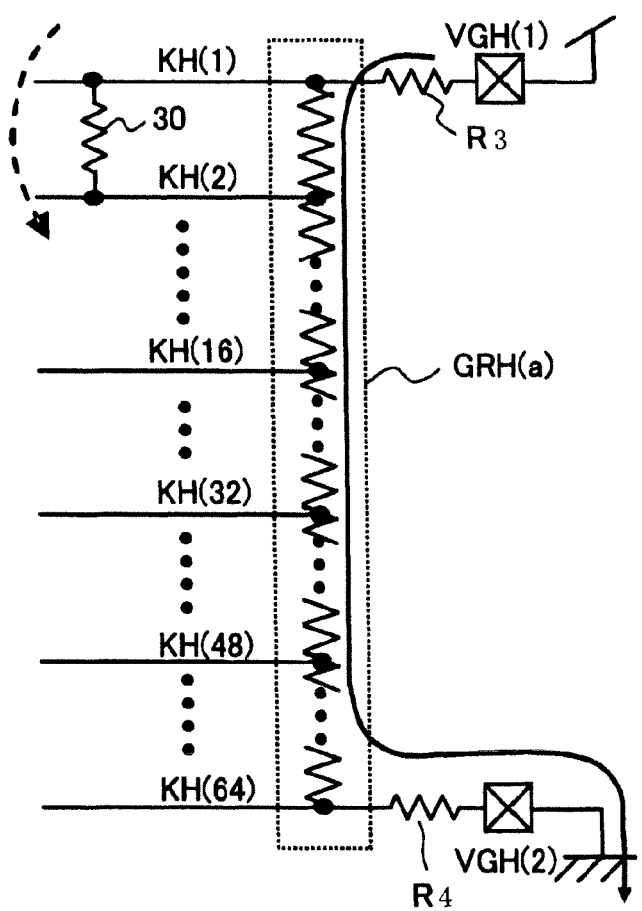
FIG. 9 is an illustration 2 of the operation of the semiconductor integrated circuit for display panel drive according to the prior art 1.
Figure 10:
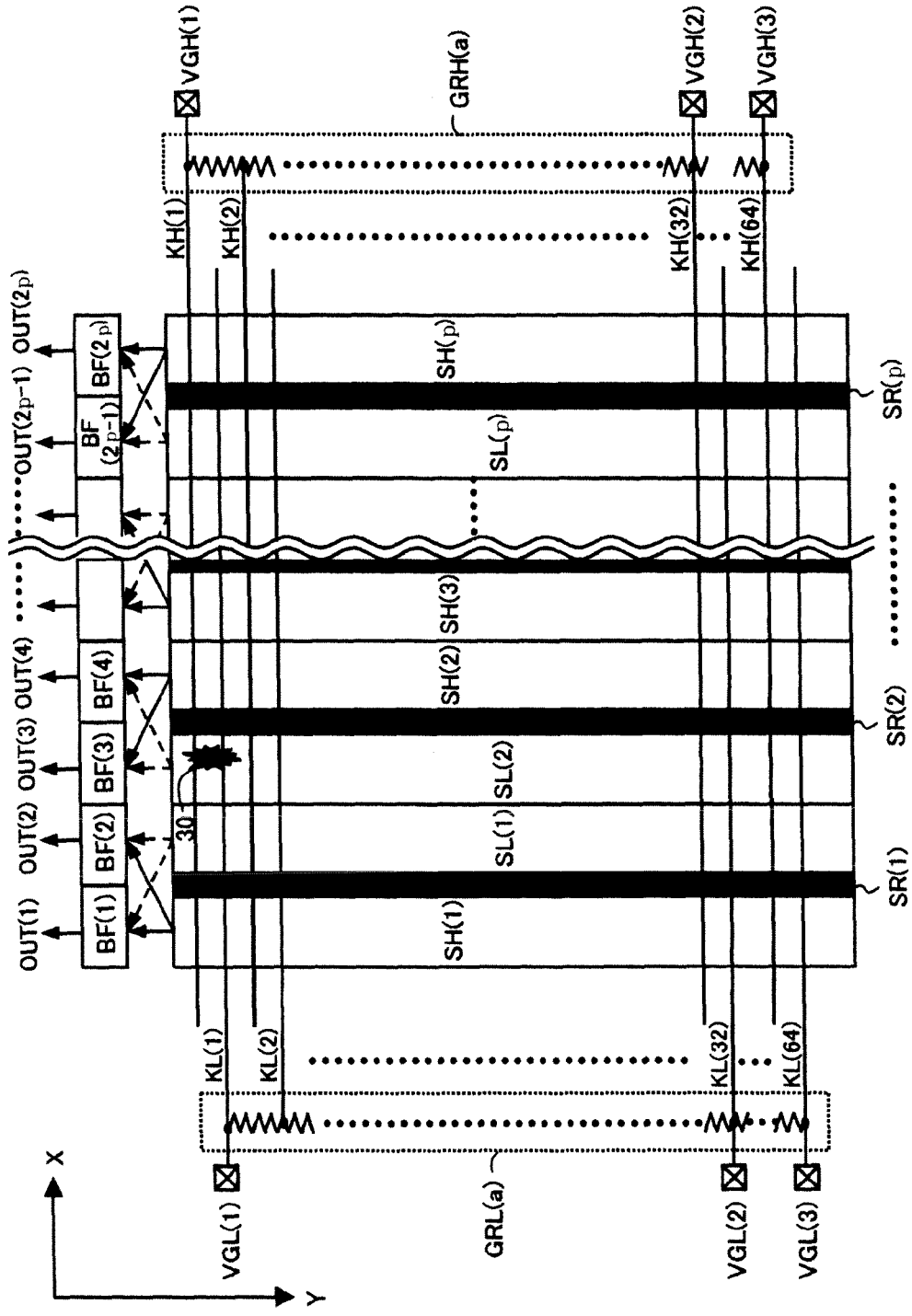
FIG. 10 is a circuit diagram 1 illustrating a configuration of a semiconductor integrated circuit for display panel drive according to a prior art 2.

The first resistance dividing circuit of positive polarity GRH (1) and the second resistance dividing circuit of positive polarity GRH (2) are equivalent to two resistance dividing circuits obtained by dividing the resistance dividing circuit GRH (a) according to the prior art 1 (FIGS. 6 and 7).

The configuration of the structural elements of negative polarity is described. The group of gradation wiring lines of negative polarity 2 is divided into n number of groups (n is a negative integer number equal to or larger than 2, n=2 according to the present exemplary embodiment). More specifically, the group of gradation wiring lines of negative polarity 2 is divided into a first group of wiring lines of negative polarity 2A and a second group of wiring lines of negative polarity 2B. The gradation wiring lines KL (1)-KL (32) constituting the first group of wiring lines of negative polarity 2A and the gradation wiring lines KL (33)-KL (64) constituting the second group of wiring lines of negative polarity 2B are alternately provided. More specifically, the first group of wiring lines of negative polarity 2A and the second group of wiring lines of negative polarity 2B are alternately provided in the order of KL (1), KL (33), KL (2), KL (34), KL (3), KL(35), . . . , KL (31), KL(63), KL (32), KL (64). The combination of the first group of wiring lines of negative polarity 2A and the second group of wiring lines of negative polarity 2B forms the group of gradation wiring lines of negative polarity 2. According to the present exemplary embodiment, the first group of wiring lines of negative polarity 2A includes a (m')th group of wiring lines of negative polarity, and the second group of wiring lines of negative polarity 2B includes a (m'+1)th group of wiring lines of negative polarity. The number of the wiring lines included in the group of gradation wiring lines of negative polarity 2 is set equally to the gradation levels (64 gradation levels in the given example).

The resistance dividing circuit of negative polarity 4 is divided into n' number of groups (two groups according to the present exemplary embodiment). The resistance dividing circuit of negative polarity 4 is divided into a first resistance dividing circuit of negative polarity GRL (1) and a second resistance dividing circuit of negative polarity GRL (2). The first resistance dividing circuit of negative polarity GRL (1) is provided at an intermediate position in the group of gradation wiring lines of negative polarity 2 or on one end side in a direction where the group of gradation wiring lines of negative polarity 2 extends. The second resistance dividing circuit of negative polarity GRL (2) is provided at an intermediate position in the group of gradation wiring lines of negative polarity 2 or on the other end side in the wiring line extending direction. According to the present exemplary embodiment, the first resistance dividing circuit of negative polarity GRL (1) constitutes a (m')th resistance dividing circuit of negative polarity, and the second resistance dividing circuit of negative polarity GRL (2) constitutes a (m'+1)th resistance dividing circuit of negative polarity.

The first resistance dividing circuit of negative polarity GRL (1) is connected to the first group of wiring lines of negative polarity 2A ((m')th group of wiring lines of negative polarity). In the first resistance dividing circuit of negative polarity GRL (1), second voltage dividing resistors R2 connected in series to each other are respectively provided between the gradation wiring lines of negative polarity KL (1)-KL (32), so that gradation potentials of negative polarity dependent upon resistance values of the second voltage dividing resistors R2 are generated in the gradation wiring lines of negative polarity KL (1)-KL (32).

The second resistance dividing circuit of negative polarity GRL (2) is connected to the second group of wiring lines of negative polarity 2B ((m'+1)th group of wiring lines of negative polarity). Similarly to the first resistance dividing circuit of negative polarity GRL (1), second voltage dividing resistors R2 connected in series to each other are respectively provided between the gradation wiring lines of negative polarity KL (33)-KL (64) in the second resistance dividing circuit of negative polarity GRL (2), so that gradation potentials of negative polarity dependent upon resistance values of the second voltage dividing resistors R2 are generated in the gradation wiring lines of negative polarity KL (33)-KL (64).

A group of gradation selector circuits of negative polarity 6 includes p number of (p is a negative integer number equal to or larger than 2) gradation selector circuits of negative polarity SL (1)-SL (p) arranged in juxtaposition at intermediation positions in the group of gradation wiring lines of negative polarity 2 or a direction where the group of gradation wiring lines of negative polarity 2 extend (lateral direction facing the drawing which is the gradation wiring routing direction) X. The "p" which is the number of the gradation selector circuits of negative polarity SL (1)-SL (p) is equal to or smaller than the number of the wiring lines of the group of gradation wiring lines of negative polarity 2 (64 according to the present exemplary embodiment). The gradation selector circuits of negative polarity SL (1)-SL (p) are respectively configured to select a gradation wiring line of negative polarity KL (x) from the group of gradation wiring lines of negative polarity 2 to fetch a gradation potential of negative polarity from the selected gradation wiring line of negative polarity KL (x).

The electrode pad VGL (1) is directly connected to one end of the gradation wiring line of negative polarity KL (1) (end of the wiring line on the side of the first resistance dividing circuit of negative polarity GRL (1)) which is the most significant wiring line in the first group of wiring lines of negative polarity 2A. The electrode pad VGL (2) is directly connected to one end of the gradation wiring line of negative polarity KL (32) (end of the wiring line on the side of the first resistance dividing circuit of negative polarity GRL (1)) which is the least significant wiring line in the first group of wiring lines of negative polarity 2A.

The electrode pad VGL (2a) is directly connected to the other end of the gradation wiring line of negative polarity KL (33) (end of the wiring line on the side of the second resistance dividing circuit of negative polarity GRL (2)) which is the most significant wiring line in the second group of wiring lines of negative polarity 2B. The electrode pad VGL (3) is directly connected to the other end of the gradation wiring line of negative polarity KL (64) (end of the wiring line on the side of the second resistance dividing circuit of negative polarity GRL (2)) which is the least significant wiring line in the second group of wiring lines of negative polarity 2B. When these electrode pads are thus connected, voltages having an equal potential can be applied to the electrode pad VGL (2) connected to the least significant wiring line in the first group of wiring lines of negative polarity 2A and the electrode pad VGL (2a) connected to the most significant wiring line in the second group of wiring lines of negative polarity 2B (which is not illustrated in FIGS. 1 and 3 and will be described in detail later).

The first resistance dividing circuit of negative polarity GRL (1) and the second resistance dividing circuit of negative polarity GRL (2) are equivalent to two resistance dividing circuits obtained by dividing the resistance dividing circuit GRL (a) according to the prior art 1 (FIGS. 6 and 7).

The group of gradation selector circuits of positive polarity SHG and the group of gradation selector circuits of negative polarity SLG are disposed away from each other in juxtaposition along a direction (y direction) orthogonal to the direction where the gradation wiring lines of positive polarity KH (1)-KH (64) and the gradation wiring lines of negative polarity KL (1)-KL (64) are arranged in juxtaposition. Any other structural elements which are similar to those illustrated in FIGS. 6 and 7 according to the prior art 1 are simply illustrated with the same reference symbols, and description of the similar structural elements is omitted.

When the gradation reference potential of positive polarity is applied by the electrode pads VGH (1)·VGH (2) to the first resistance dividing circuit GRH (1), more significant gradation potentials of positive polarity VH (1)-VH (32) are generated. When the gradation reference potential of positive polarity is applied by the electrode pads VGH (2a)·VGH (3) to the second resistance dividing circuit GRH (2), less significant gradation potentials of positive polarity VH (33)-VH (64) are generated.

Similarly to the description in the preceding section, more significant gradation potentials of negative polarity VL (1)-VL (32) are generated when the gradation reference potential of negative polarity is applied by the electrode pads VGL (1)·VGL (2) to the first resistance dividing circuit GRL (1), and less significant gradation potentials of positive polarity VL (33)-VL (64) are generated when the gradation reference potential of negative polarity is applied by the electrode pads VGL (2a)·VGL (3) to the second resistance dividing circuit GRL (2).

A testing operation for checking whether the gradation wiring lines are short-circuited in the semiconductor integrated circuit for display panel drive according to the present exemplary embodiment thus configured is described below referring to FIG. 4. First, the testing operation on the structural elements of positive polarity is described. A first voltage is applied to the most significant electrode pad VGH (1) on the side of the first resistance dividing circuit of positive polarity GRH (1), and a second voltage different to the first voltage is applied to the most significant electrode pad VGH (2a) on the side of the second resistance dividing circuit of positive polarity GRH (2). Normally, the first voltage, which is a high voltage, is applied to the electrode pad VGH (1), and the second voltage, which is a low voltage, is applied to the electrode pad VGH (2a) (first voltage>second voltage).

In the event of a gradation wiring short circuit 3 between the adjacent ones of the gradation wiring lines of positive polarity KH (1)-KH (64) (for example, between the gradation wiring line of positive polarity KH (1) and the gradation wiring line of positive polarity KH (33)), there occurs a leak current flow between the electrode pad VGH (1) and the electrode pad VGH (2a), based on which the gradation wiring short circuit 30 is detected. The position of the gradation wiring short circuit 30 illustrated in the drawing is just an example, and the inter-wiring short circuit causing the leak current can be similarly detected no matter where the gradation wiring short circuit 30 occurs. The leak current can be similarly measured on the structural elements of negative polarity. The voltage can be arbitrarily applied to any of the three electrode pads.

The present exemplary embodiment described the operation of the semiconductor integrated circuit according to the present invention wherein there are four gradation reference potential inputs on both sides of the positive and negative polarities. The number of inputs, however, is not limited thereto, and the present invention is similarly effective in any circuit configuration where there are more or less inputs. Further, the present invention is similarly effective in any circuit configuration where more or less than 64 gradation levels are generated.

Figure 4:
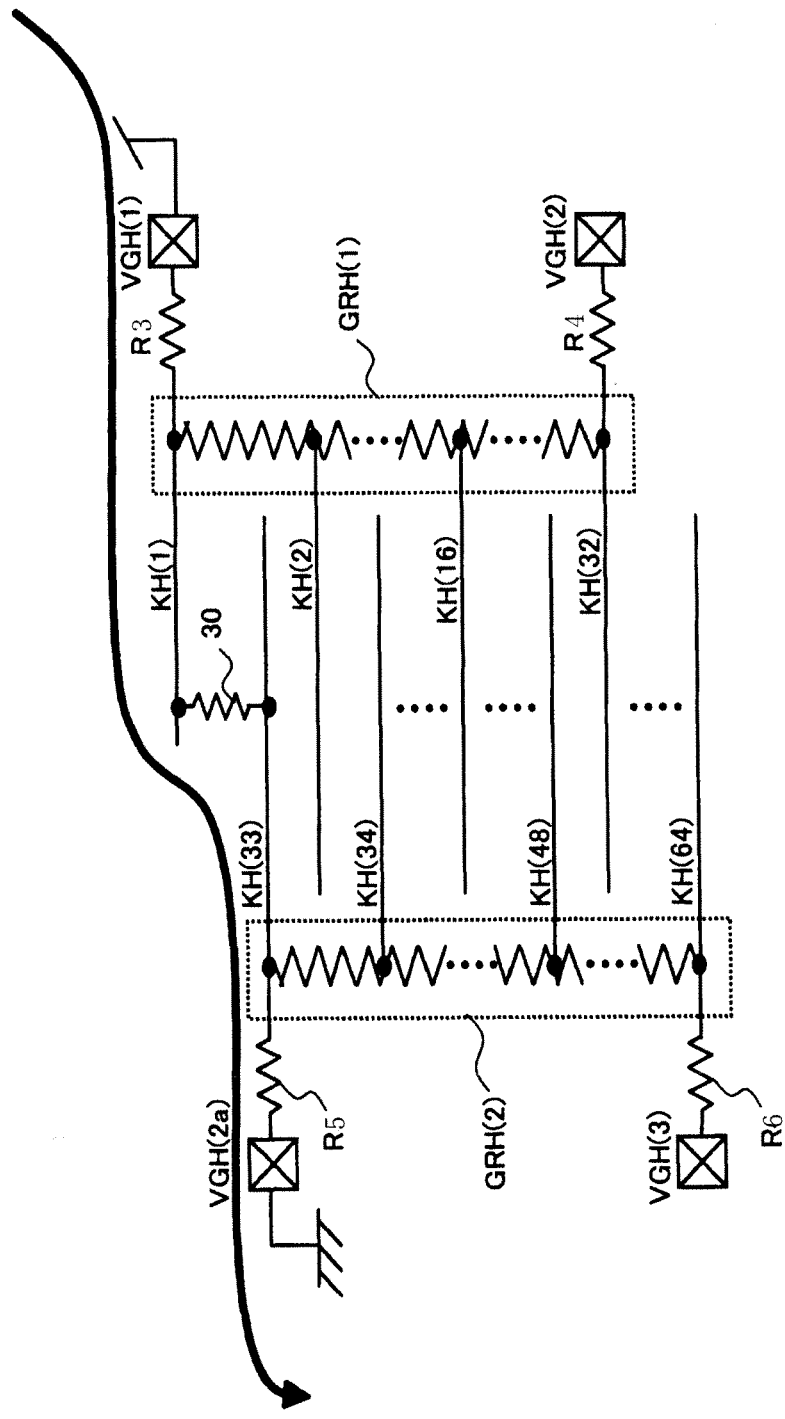
FIG. 4 is an illustration of an operation of the semiconductor integrated circuit for display panel drive according to the exemplary embodiment 1.

As illustrated in FIG. 4, resistance components R3 and R4 are possibly generated in the wiring line which connects the electrode pad VGH (1) for applying the gradation reference potential of positive polarity to the upper end of the first resistance dividing circuit of positive polarity GRH (1), or in the wiring line which connects the electrode pad VGH (2) to the lower end of the first resistance dividing circuit of positive polarity GRH (1). Similarly, resistance components R5 and R6 are possibly generated in the wiring line which connects the electrode pad VGH (2a) to the upper end of the second resistance dividing circuit of positive polarity GRH (2), or in the wiring line which connects the electrode pad VGH (3) to the lower end of the second resistance dividing circuit of positive polarity GRH (2). When any of these resistance components R3-R6 is generated, a voltage drop thereby caused results in the occurrence of an error in a desirable voltage division between the first resistance dividing circuit of positive polarity GRH (1) and the second resistance dividing circuit of positive polarity GRH (2), consequently generating a shift in a gamma characteristic curve. In such a case, the resistance values of R3, R4, R5, and R6 are taken into account to adjust the resistance values of the resistance dividing circuits GRH (1) and GRH (2). The adjustment of the resistance values can prevent such a shift in the gamma characteristic curve.

Exemplary Embodiment 2

Figure 11:
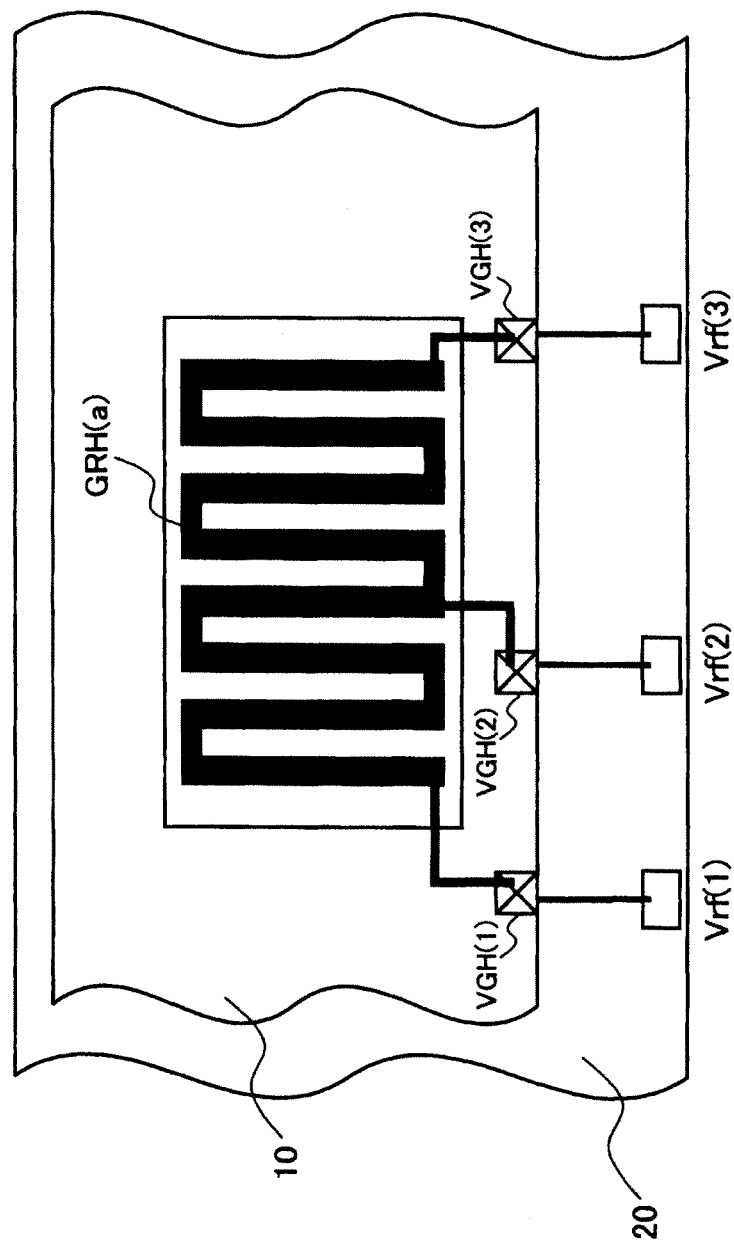
FIG. 11 is a conceptual view of a main section of a display panel driving module or a display device according to a comparative example to the exemplary embodiment 2.

Before an exemplary embodiment 2 of the present invention is described, a technical object to be achieved by the exemplary embodiment 2 is described referring to FIG. 11. FIG. 11 is a circuit diagram of a comparative example to the exemplary embodiment 2, conceptually illustrating a main section of a display panel driving module or a display device. Referring to FIG. 11, 10 is a semiconductor integrated circuit for display panel drive, and 20 is a package to which the gradation potentials are inputted. The gradation potentials are applied from an external connection terminal Vrf (k) to an electrode pad VGH (k), and the gradation potentials are then supplied to the semiconductor integrated circuit 10 for display panel drive (k=1, 2, 3). Because of a structure normally provided wherein the external connecter terminal Vrf and the electrode pad are equally provided, it is a difficult task to accomplish the solution of the inter-wiring short circuit test on the package 20. According to the exemplary embodiment 2, the semiconductor integrated circuit is equipped with a configuration necessary for testing short circuit between gradation wiring lines.

Below is described connection of resistance dividing circuits in the driving module according to the exemplary embodiment 2 referring to FIG. 5. According to the exemplary embodiment 2, the electrodes pad VGH (2) and the electrode pad VGH (2a) to which the gradation reference potential of positive polarity is inputted are connected in series to each other on the package 20. Similarly, the electrodes pad VGL (2) and the electrode pad VGL (2a) to which the gradation reference potential of negative polarity is inputted are connected in series to each other on the package 2. In the connection structure, the electrode pads are connected by metal wires, or the electrode pads are connected by patterns on the package when a chip is mounted in the package 20 with its face down.

The package 20 may be a ceramic package or a resin package having multiple pin outputs, or a semiconductor integrated circuit may be mounted on a circuit on the package to configure a driving module. The present invention is applied to the driving module in the exemplary embodiments 1 and 2. When a similar connection structure is built on a display panel, the present invention is effectively applied to a display device.

INDUSTRIAL APPLICABILITY

The technology accomplished by the present invention enables reduction of a chip area by avoiding an area increase of wiring and diffusion regions, while guaranteeing a good testing facility for checking whether short circuit is occurring between gradation wiring lines due to any failure in a semiconductor manufacturing process. The present invention thus technically advantageous is applicable to a semiconductor integrated circuit for display panel drive, a display panel driving module, and a display device.

DESCRIPTION OF REFERENCE SYMBOLS 1 group of gradation wiring lines of positive polarity
1A first group of wiring lines of positive polarity
1B second group of wiring lines of positive polarity
2 group of gradation wiring lines of negative polarity
2A first group of wiring lines of negative polarity
2B second group of wiring lines of negative polarity
3 resistance dividing circuit of positive polarity
4 resistance dividing circuit of negative polarity
5 group of gradation selector circuits of positive polarity
6 group of gradation selector circuits of negative polarity
10 semiconductor integrated circuit for display panel drive
20 package (or display panel)
30 short circuit between gradation wiring lines (particle-related short circuit)
BF (1)-BF (2p) buffer
GRH (1) first resistance dividing circuit of positive polarity
GRH (2) second resistance dividing circuit of positive polarity
GRL (1) first resistance dividing circuit of negative polarity
GRL (2) second resistance dividing circuit of negative polarity
KH (1)-KH (64) gradation wiring line of positive polarity
KL (1)-KL (64) gradation wiring line of negative polarity
OUT (1)-OUT (2p) liquid crystal drive output
SH (1)-SH (p) gradation selector circuit of positive polarity
SL (1)-SL (p) gradation selector circuit of negative polarity
SHG group of gradation selector circuits of positive polarity
SLG group of gradation selector circuits of negative polarity
SR (1)-SR (p) P-N isolation region
Vrf (1)-Vrf (3) external connection terminal
VGH (1)-VGH (3) electrode pad to which gradation reference potential of positive polarity is inputted
VGL (1)-VGL (3) electrode pad to which gradation reference potential of negative polarity is inputted

What is claimed is:

1. A semiconductor integrated circuit configured to drive a display panel, comprising:
    a group of gradation wiring lines of positive polarity including a plurality of gradation wiring lines of positive polarity arranged in juxtaposition;
    a resistance dividing circuit of positive polarity including a plurality of first voltage dividing resistors serially connected to each other, the resistance dividing circuit of positive polarity generating gradation potentials of positive polarity dependent upon resistance values of the first voltage dividing resistors in the gradation wiring lines of positive polarity by providing the first voltage dividing resistors between the gradation wiring lines of positive polarity;
    a group of gradation selector circuits of positive polarity including a plurality of gradation selector circuits of positive polarity arranged in juxtaposition between the gradation wiring lines of positive polarity or along a direction where the gradation wiring lines of positive polarity extend, the gradation selector circuits of positive polarity each selecting one of the group of gradation wiring lines of positive polarity to fetch a gradation potential of positive polarity from the selected gradation wiring line of positive polarity;
    a group of gradation wiring lines of negative polarity including a plurality of gradation wiring lines of negative polarity arranged in juxtaposition in parallel with the gradation wiring lines of positive polarity;
    a resistance dividing circuit of negative polarity including a plurality of second voltage dividing resistors serially connected to each other, the resistance dividing circuit of negative polarity generating gradation potentials of negative polarity dependent upon resistance values of the second voltage dividing resistors in the gradation wiring lines of negative polarity by providing the second voltage dividing resistors between the gradation wiring lines of negative polarity; and
    a group of gradation selector circuits of negative polarity including a plurality of gradation selector circuits of negative polarity arranged in juxtaposition between the gradation wiring lines of negative polarity or along a direction where the gradation wiring lines of negative polarity extend, the gradation selector circuits each selecting one of the group of gradation wiring lines of negative polarity to fetch a gradation potential of negative polarity from the selected gradation wiring line of negative polarity, wherein
    the group of gradation wiring lines of positive polarity is divided into first–(n)th groups of wiring lines of positive polarity including a (m)th group of wiring lines of positive polarity and a (m+1)th group of wiring lines of positive polarity (n is a positive integer number meeting $2 \leq n$, m is a positive integer number meeting $1 \leq m \leq n-1$),
    the gradation wiring lines of positive polarity constituting the (m)th group of wiring lines of positive polarity and the gradation wiring lines of positive polarity constituting the (m+1)th group of wiring lines of positive polarity are alternately provided,
    the group of gradation wiring lines of negative polarity is divided into first–(n')th groups of wiring lines of negative polarity including a (m')th group of wiring lines of negative polarity and a (m'+1)th group of wiring lines of negative polarity (n' is a negative integer number meeting $2 \leq n'$, m' is a negative integer number meeting $1 \leq m' \leq n'-1$),
    the gradation wiring lines of negative polarity constituting the (m')th group of wiring lines of negative polarity and the gradation wiring lines of negative polarity constituting the (m'+1)th group of wiring lines of negative polarity are alternately provided, the resistance dividing circuit of positive polarity is divided into first –(n)th resistance dividing circuits of positive polarity, the first –(n)th resistance dividing circuits of positive polarity include (m)th resistance dividing circuits of positive polarity provided between the gradation wiring lines of positive polarity or on one end side of the direction where the gradation wiring lines of positive polarity extend and connected to the (m)th group of wiring lines of positive polarity, and (m+1)th resistance dividing circuits of positive polarity provided between the gradation wiring lines of positive polarity or on the other end side of the direction where the gradation wiring lines of positive polarity extend and connected to the (m+1)th group of wiring lines of positive polarity, the resistance dividing circuit of negative polarity is divided into first –(n')th resistance dividing circuits of negative polarity, the first –(n')th resistance dividing circuits of negative polarity include (m')th resistance dividing circuits of negative polarity provided between the gradation wiring lines of negative polarity or on one end side of the direction where the gradation wiring lines of negative polarity extend and connected to the (m')th group of wiring lines of negative polarity, and (m'+1)th resistance dividing circuits of negative polarity provided between the gradation wiring lines of negative polarity or on the other end side of the direction where the gradation wiring lines of negative polarity extend and connected to the (m'+1)th group of wiring lines of negative polarity, and wherein each of the gradation wiring lines of positive polarity constituting the (m)th group of wiring lines of positive polarity is not connected to an adjacent one of the gradation wiring lines of positive polarity constituting the (m+1)th group of wiring lines.

2. The semiconductor integrated circuit as claimed in claim 1, wherein the group of gradation wiring lines of positive polarity and the group of gradation wiring lines of negative polarity are arranged in a direction orthogonal to the direction in which the gradation wiring lines of positive polarity extend.

3. The semiconductor integrated circuit as claimed in claim 1, wherein the n is 2, and the m is 1.

4. The semiconductor integrated circuit as claimed in claim 1, wherein the n is at least 3.

5. The semiconductor integrated circuit as claimed in claim 1, further comprising:

first electrode pads on both ends of the first –(n)th resistance dividing circuits of positive polarity, and second electrode pads on both ends of the first –(n')th resistance dividing circuits of negative polarity.

6. The semiconductor integrated circuit as claimed in claim 5, wherein a voltage drop resulting from resistance components generated between the first –(n)th resistance dividing circuits of positive polarity and the first electrode pads is taken into account to set resistances values of the first voltage dividing resistors constituting the first –(n)th resistance dividing circuits of positive polarity, and a voltage drop resulting from resistance components generated between the first –(n')th resistance dividing circuits of negative polarity and the second electrode pads is taken into account to set resistances values of the second voltage dividing resistors constituting the first –(n')th resistance dividing circuits of negative polarity.

7. A display panel driving module, comprising:

the semiconductor integrated circuit as claimed in claim 1, and a package in which the semiconductor integrated circuit is implemented, wherein the resistance dividing circuits of positive polarity and the resistance dividing circuits of negative polarity are implemented in series in the package.

8. A display device, comprising:

the semiconductor integrated circuit as claimed in claim 1, and a display panel in which the semiconductor integrated circuit is implemented, wherein the resistance dividing circuits of positive polarity and the resistance dividing circuits of negative polarity are implemented in series in the display panel.

* * * * *